United States Patent
Williams et al.

(10) Patent No.: US 9,205,519 B2
(45) Date of Patent: Dec. 8, 2015

(54) PALLET BOARD REMOVER

(71) Applicants: Lonnie Max Williams, Jacksonville, IL (US); Jeffery Ray Williams, Springfield, IL (US); Gregory John Williams, White Hall, IL (US)

(72) Inventors: Lonnie Max Williams, Jacksonville, IL (US); Jeffery Ray Williams, Springfield, IL (US); Gregory John Williams, White Hall, IL (US)

(73) Assignee: PALLET REPAIR SYSTEMS, INC., Jacksonville, IL (US)

( * ) Notice: Subject to any disclaimer, the term of this patent is extended or adjusted under 35 U.S.C. 154(b) by 305 days.

(21) Appl. No.: 13/872,123

(22) Filed: Apr. 28, 2013

(65) Prior Publication Data

US 2013/0298375 A1 Nov. 14, 2013

Related U.S. Application Data

(60) Provisional application No. 61/687,712, filed on Apr. 30, 2012.

(51) Int. Cl.
*H01L 21/687* (2006.01)
*B23P 19/04* (2006.01)

(52) U.S. Cl.
CPC .......... *B23P 19/041* (2013.01); *Y10T 29/49822* (2015.01); *Y10T 29/53683* (2015.01)

(58) Field of Classification Search
CPC ............ B25B 1/00; B25B 1/2452; B25B 1/20
See application file for complete search history.

(56) References Cited

U.S. PATENT DOCUMENTS

| | | | |
|---|---|---|---|
| 6,702,269 B1 * | 3/2004 | Tadich | B27F 7/155 269/304 |
| 8,002,254 B2 * | 8/2011 | Bayer | B23Q 1/0018 269/20 |
| 8,366,087 B2 * | 2/2013 | McAdoo | B25H 1/10 227/154 |
| 2005/0022354 A1 * | 2/2005 | Dykstra | B23P 19/041 29/426.4 |
| 2013/0298375 A1 * | 11/2013 | Williams | B23P 19/041 29/426.5 |

* cited by examiner

*Primary Examiner* — Lee D Wilson
(74) *Attorney, Agent, or Firm* — Law Office of Robert M. Patino

(57) ABSTRACT

A pallet board remover for removing a board from a pallet is provided. The pallet board remover comprises a top surface for receiving the pallet, an operation gap provided on the top surface, and an at least one removal bar assembly operationally located near the operation gap. A method of removing a board from a pallet is also provided.

15 Claims, 9 Drawing Sheets

PALLET BOARD REMOVER

CROSS REFERENCE TO RELATED APPLICATIONS

This application claims the benefit of U.S. Provisional Application No. 61/687,712, filed Apr. 30, 2012.

BACKGROUND OF THE INVENTION

The invention relates to a pallet repair system, and more specifically the invention relates to a pallet board remover where a lead board, a deckboard or a plurality of deckboards attached to a pallet may be efficiently removed by a mechanical mechanism.

Damaged deckboards and damaged lead boards on a pallet make for faulty pallets that are unsafe to support loads. The use of faulty pallets with damaged deckboards or damaged lead boards can lead to the damage of product or the injury of workers or customers. It is extremely costly to replace entire pallets and it is much more efficient just to repair the damaged pallet if one or more damaged deckboards or lead boards exist on the pallet. Damaged deckboards and damaged lead boards must be removed so that the pallet cores can be prepared for repair. The prepared pallet is then repaired by replacing the board, or sent to other stations where the replacement boards are nailed back on to make the pallet serviceable again.

The manual removal of deckboards, particularly the interior deckboards, has long been the most physically demanding part of the job which can result in injuries on the job and add additional labor costs in time alone. Destacking and stacking pallets for the process has been improved over the last 20 or so years by the development of machines that perform this work, as has the movement of pallets to and from repair operators via conveyors. Pneumatic nail guns have eliminated the manual task of driving nails with a hammer. However, a solution to the manual removal of deckboards in favor of an affordable mechanical deckboard removal device solution has remained elusive.

Historically, damaged deckboards and damaged lead boards (collectively referred to as "boards" or individually referred to as "board") have been removed manually. This removal is achieved typically with a steel pry bar or other hand tool. A pry bar or other hand tool can only be applied to one position of the board at a time. The board being removed experiences stresses at different points as the operator pries and twists the board near nailed joints. This action often results in additional damage such as breaks to the boards and the pallet. Another consequence of this action is that the board will crack and splinter in the nail zone portion of the board, which in turn leaves nails in the stringer. If a nail is left in the stringer, additional time is required from the laborer to either remove the nail or drive it down into the stringer, both of which are physically taxing jobs. The development of a mechanical deckboard removal device would alleviate the need to do the job manually.

Furthermore, there are entities that use hundreds of thousands of pallets to move product or inventory. These entities have to manage the repair of hundreds to thousands of pallets that need boards removed quickly so that the pallets might be repaired. If the boards can be removed quickly, then the time spent repairing the pallets and the down time of not being able to use the pallet is minimized. Thus, the ability to expedite the board removal process would require a means of removing the damaged boards quickly from the board removal station. The use of a conveyor belt would help expedite this process by removing boards from the removal site to a container or dump station so that continuous work of the pallets that need repair would not be impaired.

Moreover, the work station that is used to remove the boards should accommodate the rapid movement and reversal of sides of the pallet. Often, there are damaged boards on both sides of the pallet. An operator needs to be able to efficiently slide the pallet on one side to the position required to efficiently remove the damaged board and then flip the pallet and possibly spin the pallet to remove a damaged board on the opposite side.

Additionally, it is beneficial to have some type of securement bar or device that helps keep the pallet situated and immobile while boards are being removed. When boards are removed quickly, the pallet itself might react from forces related to the immediate departure of the nails that secured the damaged board in a violent manner. Elastic forces may cause the pallet to jump or shift in a manner that could injure an operator or do more damage to the pallet itself.

Thus, there is a need for a device that can efficiently remove damaged lead boards and deckboards rapidly from pallets without breaking the board or the pallet. The method should be efficient enough such that the speed of the boards removed would merit the use of a conveyor belt or other transport device. However, the machine should be flexible enough to accommodate a hopper or bin receiver for the damaged boards that have been removed for operations that do not require the volume of work that would merit a conveyor belt.

There is also a need for a device that can remove boards without leaving nails in the stringer. By removing the boards without nails being stuck in the stringer, time is saved and injury to the workers can be avoided. Furthermore, the integrity of the pallet and stringer is preserved as additional stress is avoided to the wood.

There is also a need for a device that employs a substantially flat top surface to accommodate the manipulation of a pallet to situate a damaged board to a position where removal would take place. The substantially flat top surface should ideally be large enough to accommodate the majority of the surface of the pallet thus reducing any elastic instability effects brought upon by the removal activity. Furthermore, the substantially flat top surface should accommodate the operator in flipping the pallet manually or mechanically to remove boards from both sides of the pallet.

There is also a need for a device with an optional safety feature to keep the pallet secure while boards are being removed. Such a safety feature should protect the operator from injury and assist in preventing undue stress in the pallet.

BRIEF SUMMARY OF THE INVENTION

The above identified needs are addressed by the present pallet board remover. One feature of the present invention is that it is provided with a top surface in order to be either used as a repair table with mechanical board removal capabilities or as an application machine that can "prep" repairable pallet cores by removing damaged deckboards. Another feature of the present invention is that it is provided with an at least one removal bar assembly that is used to remove a deckboard or a lead board from a stringer.

In one embodiment of the present invention, a pallet board remover is provided with a top surface for receiving a pallet and an operation gap provided on the top surface for allowing a removed board from the pallet to fall from the top surface. Furthermore, an at least one removal bar assembly is also provided that is operationally located near the operation gap to remove the board or boards that are placed over the operation gap.

In another embodiment, the present invention is a method of removing a board from a pallet comprising the steps of loading a pallet onto a top surface of a pallet board remover, positioning the board over an operation gap of the top surface, and engaging an activation switch that actuates a driving action of an at least one removal bar assembly.

DETAILED DESCRIPTION

Figure 1:
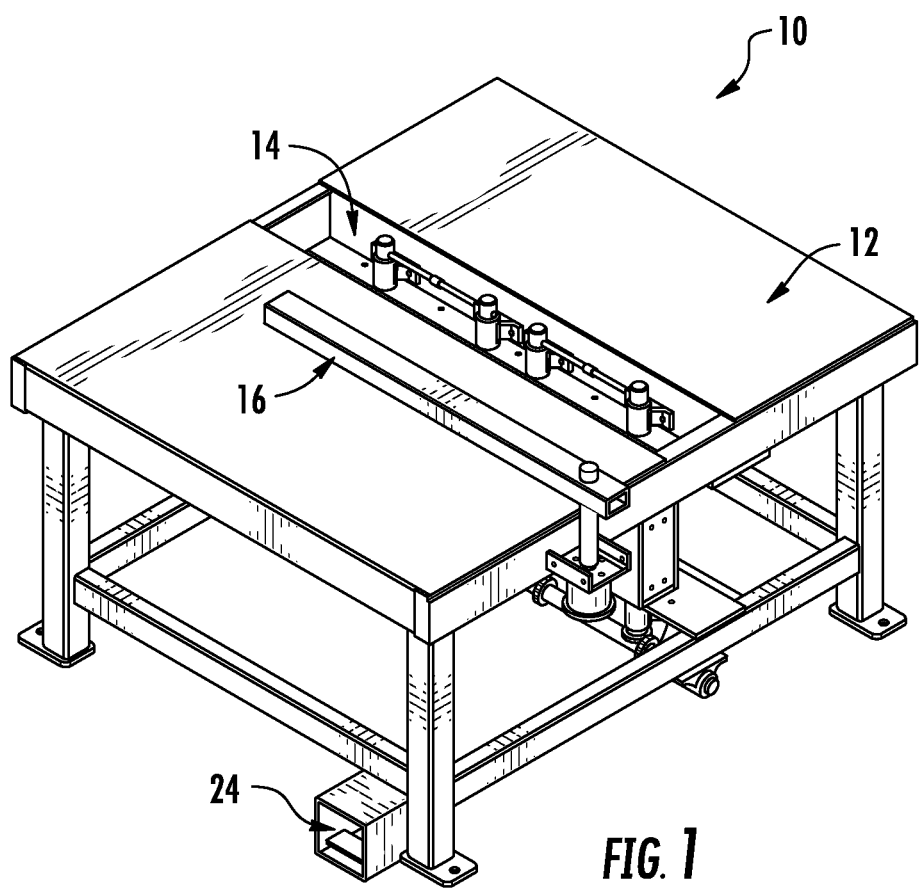
FIG. 1 is a front perspective view of a pallet board remover with four removal bar assemblies.
Figure 2:
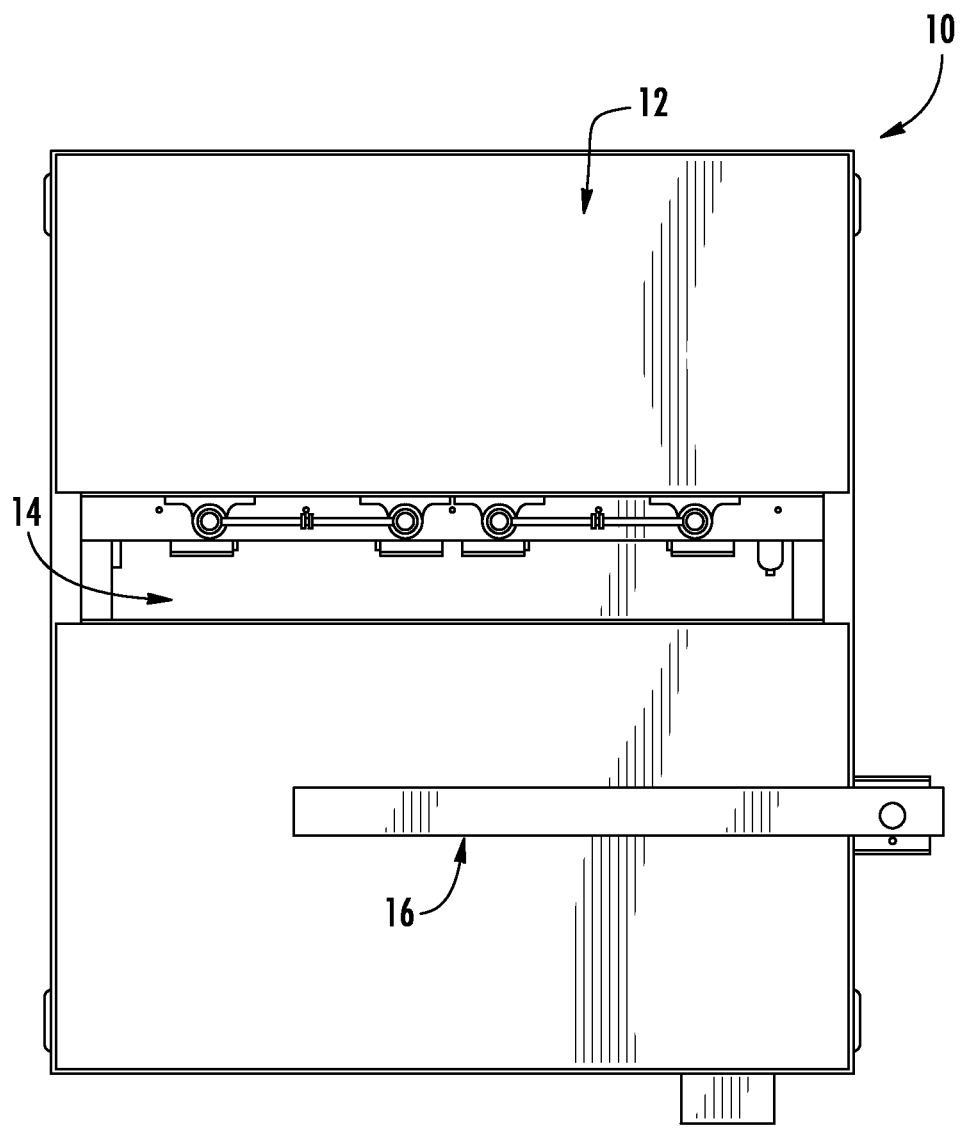
FIG. 2 is a top view of the pallet board remover.
Figure 3:
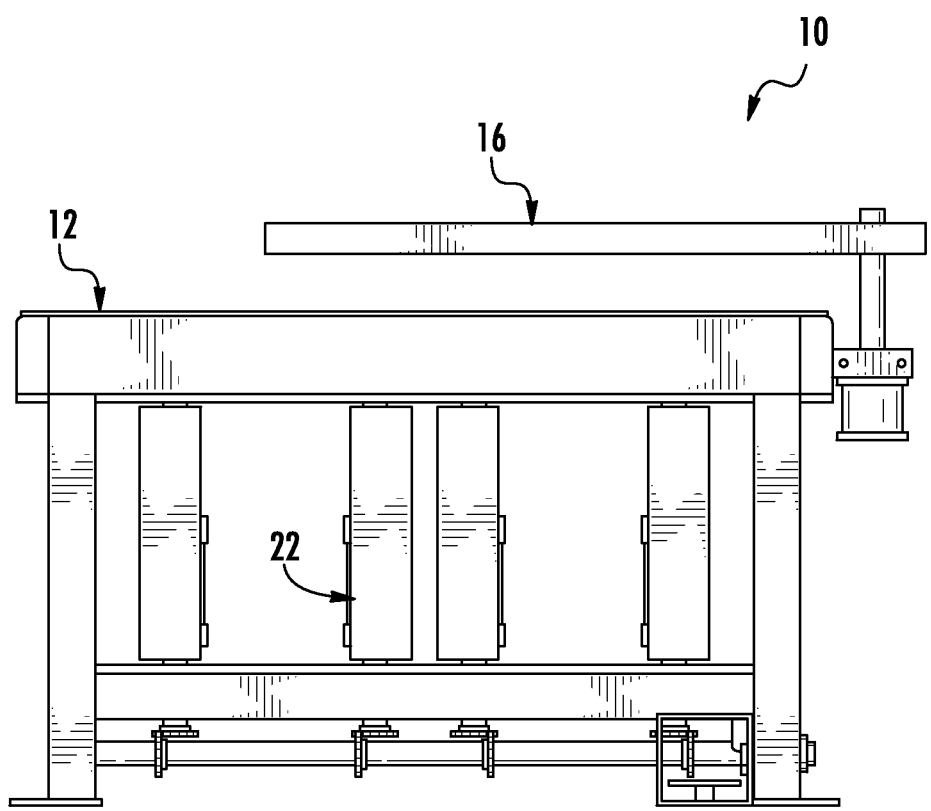
FIG. 3 is a front view of the pallet board remover.
Figure 4:
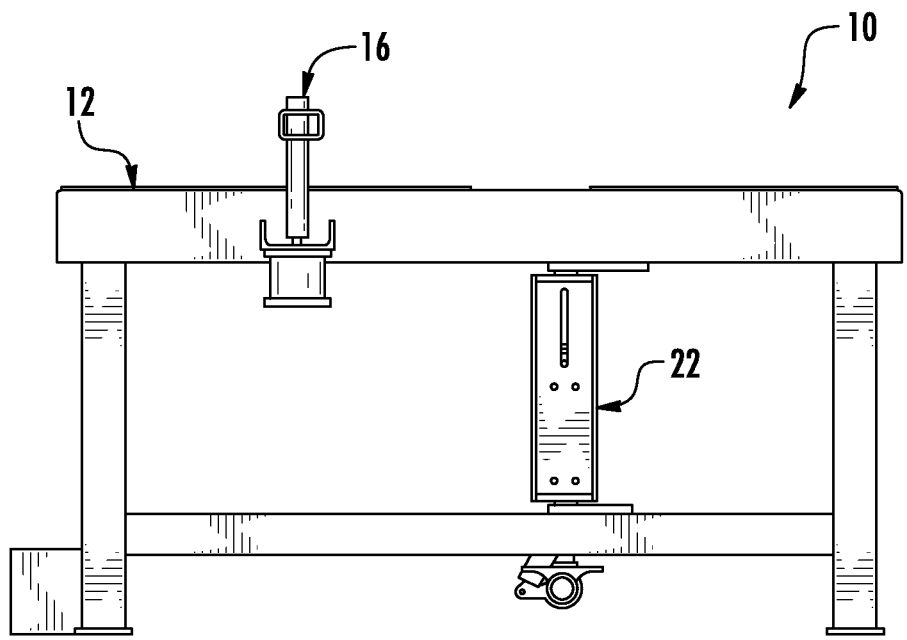
FIG. 4 is a side view of the pallet board remover.

As used herein, the term "pallet" refers to a load support apparatus containing a plurality of pieces of lumber arranged perpendicular to each other to create a supportive structure. The term "stringer" refers to one or more pieces of lumber arranged lengthwise in the pallet. The term "board" refers to one or more pieces of lumber arranged widthwise in the pallet and perpendicular to the stringers. Boards may refer to deckboards or lead boards. The stringers are positioned parallel to each other and in such a way that each thinner long edge is in contact with the wider long edges of a plurality of boards. The boards are affixed to the stringers with nails, which collectively creates both top and bottom surfaces of the pallet. The stringers and boards are preferably constructed of wood. The pallets are preferably standard U.S. grocery pallets 48 inches wide by 40 inches long, although other types of pallets may be used.

Referring to FIGS. 1-4, a pallet board remover 10 for removing a board from a pallet is provided. The pallet board remover 10 comprises a top surface 12 that is generally flat and smooth. The top surface 12 is preferably rectangular in shape but may be oval, square, or other shape as deemed desired by an operator or manufacturer. The top surface 12 is provided with an operation gap 14. The operation gap 14 is preferably rectangular in shape, though other shapes such as square, trapezoid, and oval may suffice. The operation gap 14 should be large enough to accommodate the width and length of the board that is desired to be removed from the pallet.

To operate the pallet board remover 10, the board that is desired to be removed is generally placed over the operation gap 14 after the pallet has been loaded onto the top surface 12. The board should be positioned such that the entire board if exposed should fall freely through the operation gap 14 if the board were not secured to the pallet. In an optional embodiment, the pallet board remover 10 further comprises a securement bar 16 that is preferably mounted to a side position of the top surface 12. The securement bar 16 is rotated manually or mechanically until the securement bar 16 is positioned over the top of the pallet. The securement bar 16 keeps the pallet from jumping up when the board is being mechanically removed. This feature may be of a static design relying on the cantilever of the securement bar 16, or it may comprise a pneumatic device that compresses the pallet with the securement bar 16 during the board removal cycle. Once the pallet is positioned so that the board is satisfactorily positioned over the operation gap 14, the operator may swing the securement bar 16 over the pallet. In the preferred embodiment, the pallet board remover 10 further comprises a securement cylinder 18 (shown in FIG. 6) that secures the securement bar 16 to the pallet such that the pallet will be relatively immoveable. In this embodiment, the pallet board remover also comprises a detented rotary securement valve 20 (shown in FIG. 6) that extends the securement cylinder 18 once actuated by the operator.

The pallet board remover 10 further comprises an at least one removal bar assembly 22 operationally located near the operation gap 14. Preferably, the pallet board remover 10 also comprises an activation switch 24 (shown in FIGS. 1 and 6). During operation of the pallet board remover 10, the operator then engages the activation switch 24 to begin a pneumatic sequence that engages the at least one removal bar assembly 22. In one embodiment, the activation switch 24 is a foot switch that an operator engages with his foot. In the preferred embodiment, the activation switch 24 is a detented foot pedal actuator of a 3-way forward valve. The activation switch 24 may also be embodied as a push button actuator or, in a safer embodiment, a pair of push button actuators (not shown).

In the safer embodiment comprising a pair of push button actuators, both push button actuators must be depressed simultaneously to operate the pallet board remover 10. This push button system embodiment provided an additional safety feature by preventing accidental activation of the pallet board remover 10 with a single button. The engagement occurs when the operator presses down on the activation switch 24 a first time.

Figure 5A:
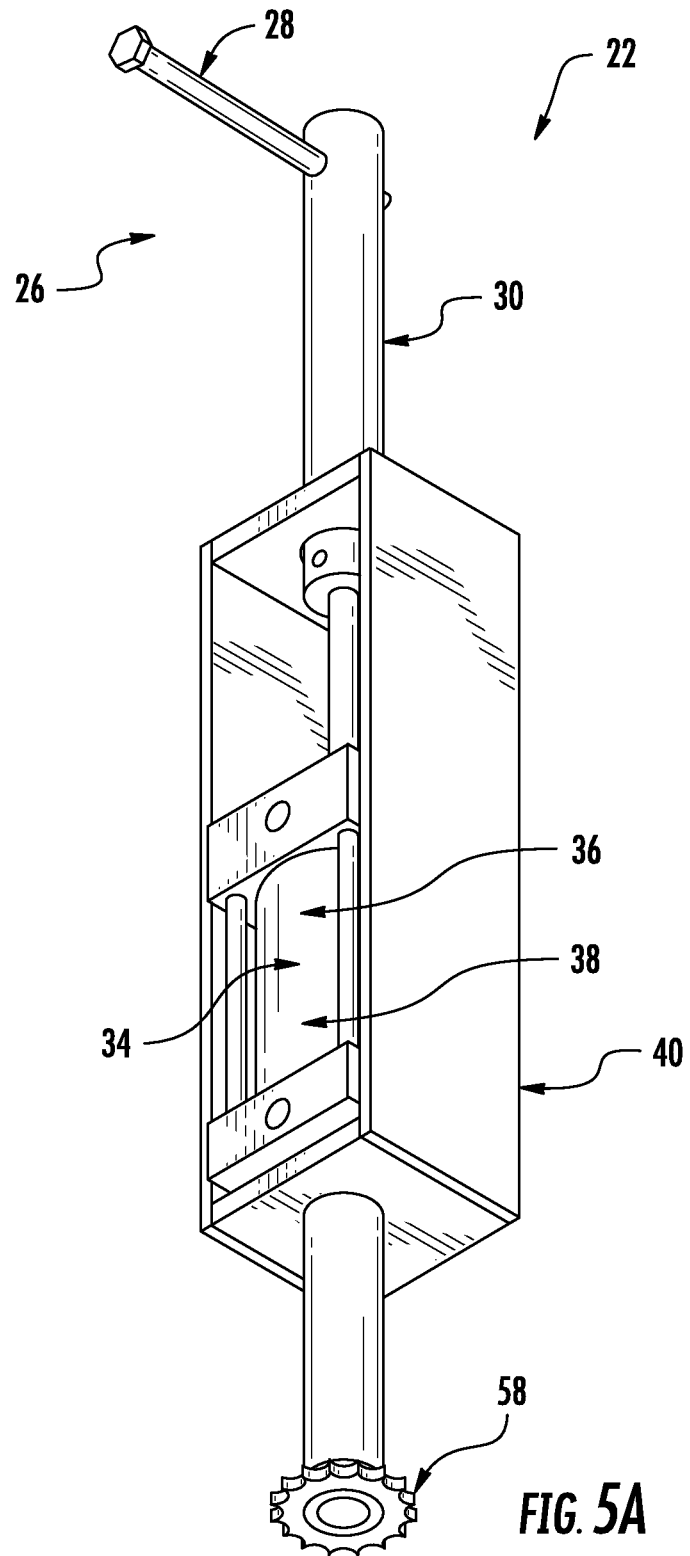
FIG. 5A is a front perspective view of a removal bar assembly.
Figure 5B:
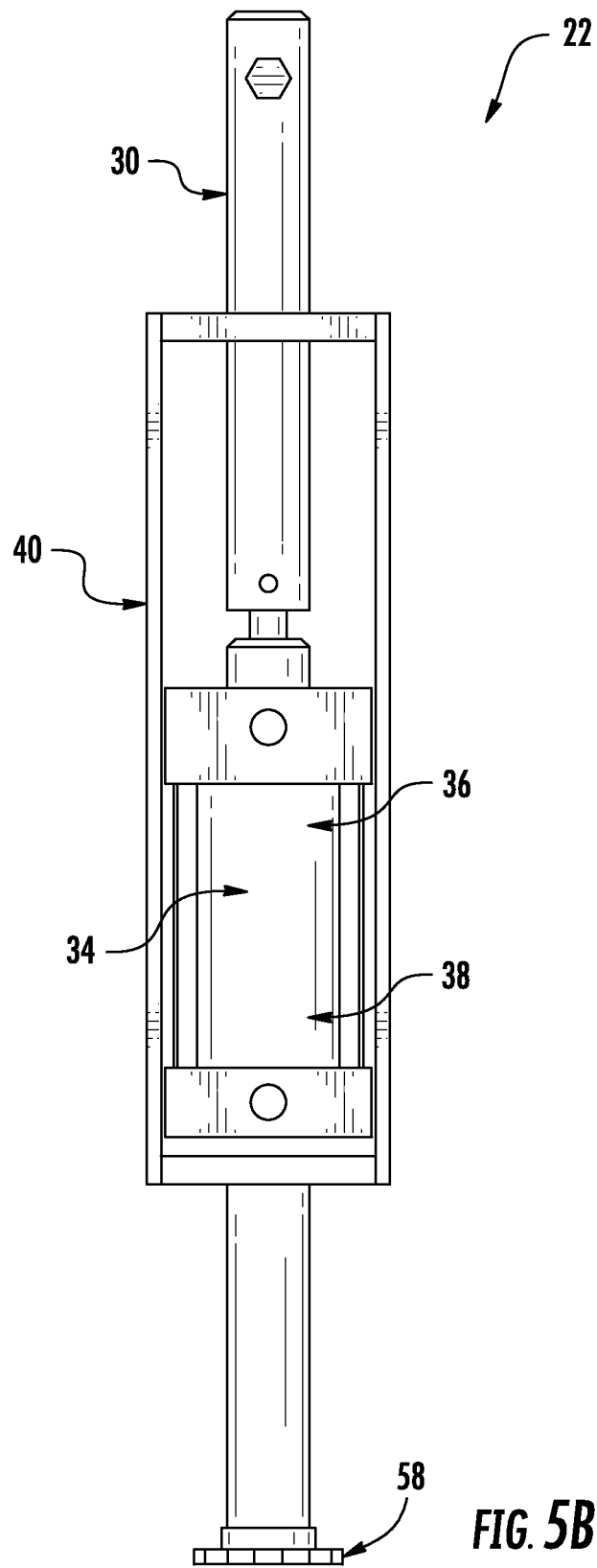
FIG. 5B is a front view of the removal bar assembly in a down position.
Figure 5C:
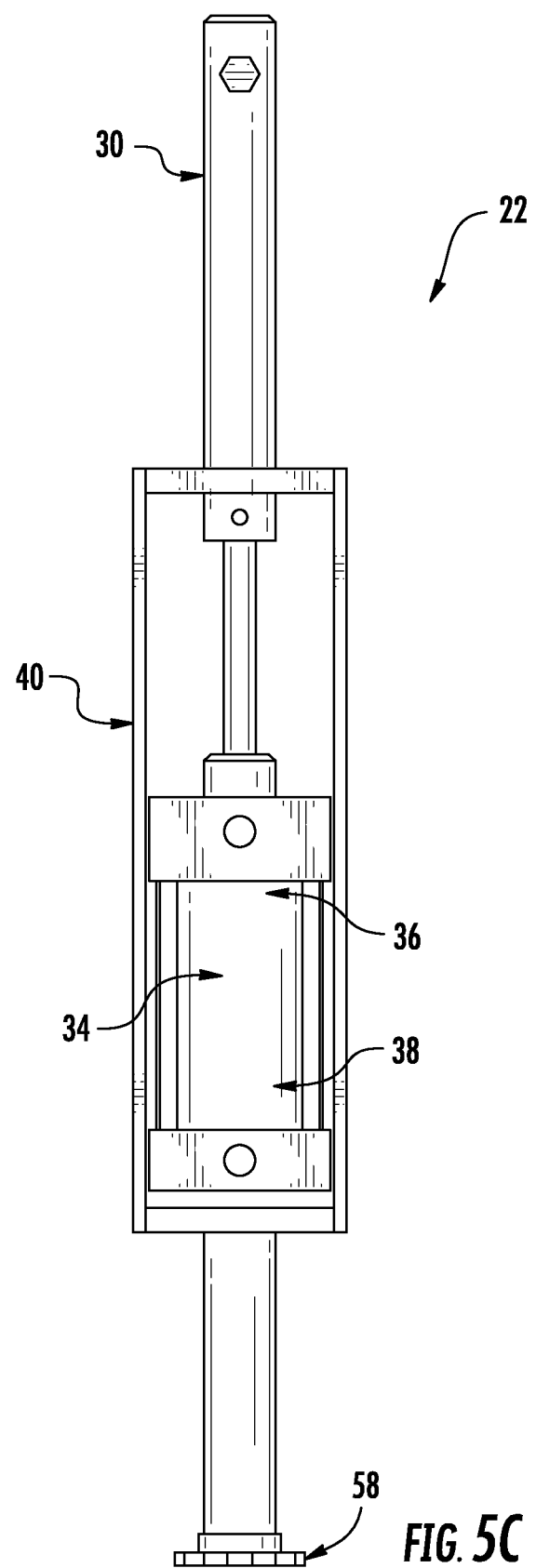
FIG. 5C is a front view of the removal bar assembly in an up position.
Figure 5D:
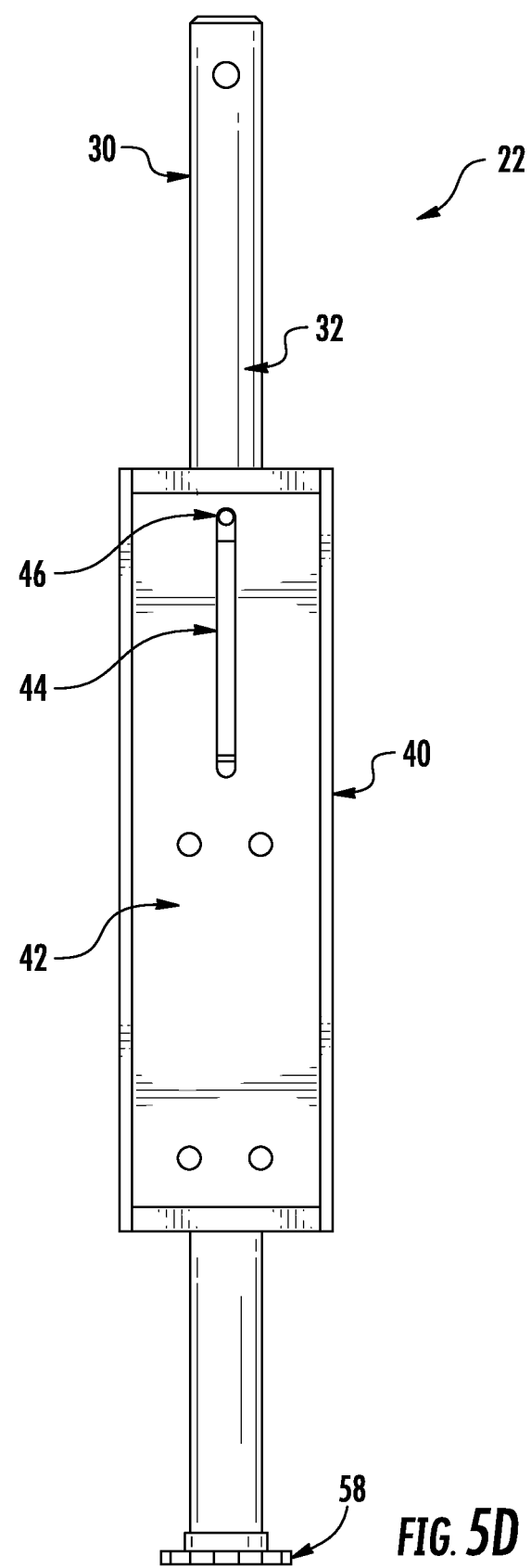
FIG. 5D is a rear view of the removal bar assembly.

As shown in FIGS. 5A-5D, the at least one removal bar assembly 22 comprises an L shaped bar 26 that resides in an upside down manner. The L shaped bar 26 comprises a protruding portion 28 and an elongated portion 30 having a back end 32. The L shaped bar 26 is preferably made of a metal that is durable and corrosion resistant. In the most preferred embodiment, the L shaped bar 26 is made of steel. The protruding portion 28 of the L shaped bar 26 is preferably round; however, other shapes may be employed such as square, rectangular, octagonal, and others. The at least one removal bar assembly 22 further comprises a driving piston 34, an upper chamber 36, and a lower chamber 38. The L shaped bar 26 is moveable between a down position as shown in FIG. 5B and an up position as shown in FIG. 5C by the driving piston 34. The driving piston 34 is controlled by air that enters the upper chamber 36 to push the driving piston 34 in a downward direction and by air that enter the lower chamber 38 to push the driving piston 34 in an upward direction. The at least one removal bar assembly 22 further comprises a housing chamber 40 having a rear end 42, a guide incision 44 located on the rear end 42, and a guide pin 46. A substantially linear movement of the L shaped bar 26 is managed by the guide incision 44 located on the rear end 42 of the housing chamber 40 as shown in FIG. 5D. To effect the substantially linear movement the L shaped bar 26 up and down, the guide pin 46 is secured to the back end 32 of the elongated portion 30 and extends into the guide incision 44. The guide incision 44 is linear in nature and is sufficiently wide to minimize the friction associated with driving the driving piston 34 up and down. This configuration ensures that the movement of the L shaped bar 26 is consistent.

In one embodiment, the pallet board remover 10 comprises four removal bar assemblies 22, and the four driving pistons 34 of the four removal bar assemblies are engaged when an operator engages the activation switch 24. The four driving pistons 34 then drive four L shaped bars 26 up through the operation gap 14 which results in the protruding portions 28 of the four L shaped bars 26 entering the pallet through a gap space located between adjacent boards in a linear fashion. As shown in FIG. 1, this driving action of the four driving pistons 34 moves the four L shaped bars 26 to the up position. This action is possible as the protruding portions 28 of the four L shaped bars 26 are parallel with the direction of the boards. The configuration shown in FIG. 1 shows the four L shaped bars 26 as two pairs of L shaped bars 26 where the protruding portions 28 are facing their counterparts; however, other configurations may be used where the protruding portions 28 each face the same direction or away from each other. Once the four L shaped bars 26 reach their predetermined height or the up position, the protruding portion 28 of each L shaped bar 26 pivots approximately 90 degrees automatically.

Figure 6:
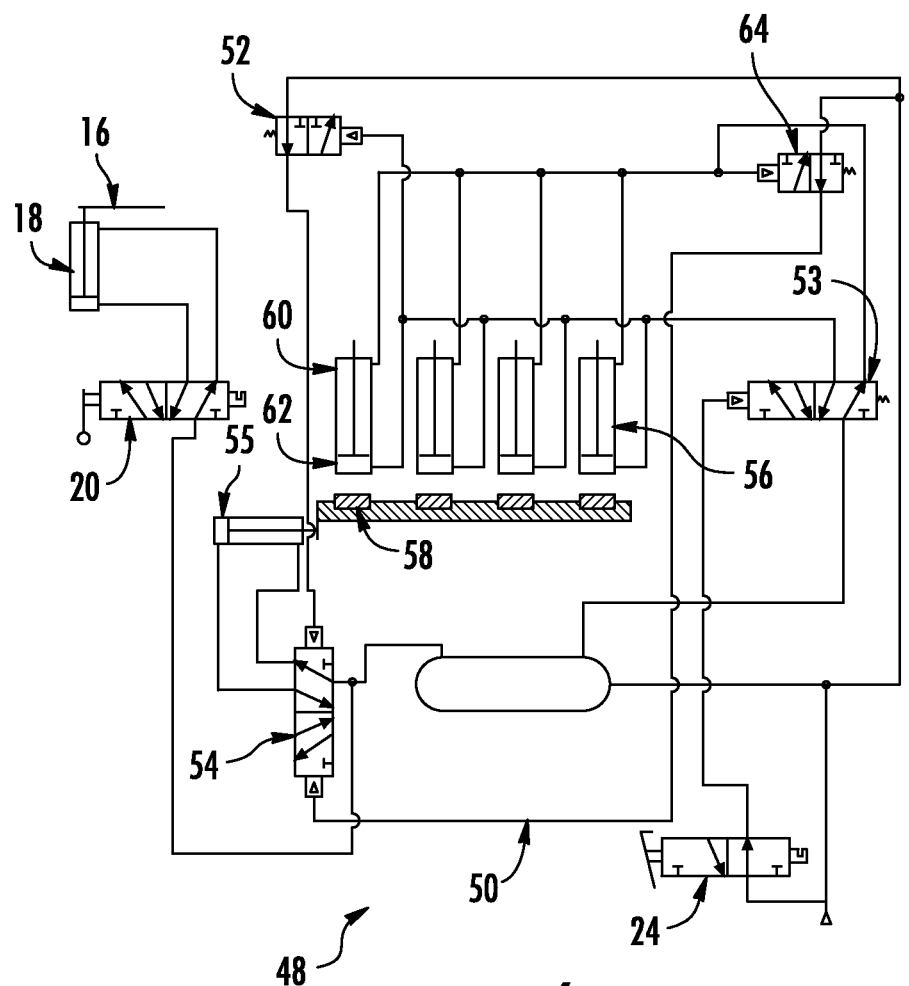
FIG. 6 is a schematic of a pneumatic control system that provides the energy required to operate the pallet board remover.

The pallet board remover 10 comprises a pneumatic control system 48 as shown in FIG. 6, which drives the driving pistons 34 and effects the pivot action of the above mentioned 90 degree turn. More specifically, the pneumatic control system 48 comprises a pneumatic air supply line 50, a sensor valve 52 connected to the pneumatic air supply line 50, a large flow air piloted 4-way air valve 53 connected to the pneumatic air supply line 50, a double air piloted 4-way air valve 54 connected to the pneumatic air supply line 50, a small cylinder 55, a cylinder or plurality of cylinders 56 (also referred to as the driving pistons 34), and a rotating gear or plurality of rotating gears 58 attached to the cylinder or plurality of cylinders 56, wherein each cylinder 56 has a rod end 60 (also referred to as the upper chamber 36 of the driving piston 34) and a cap end 62 (also referred to as the lower chamber 38 of the driving piston 34), and wherein both the rod end 60 and cap end 62 are connected to the pneumatic air supply line 50. The pneumatic control system 48 further comprises a 3-way normally open sensor valve 64 connected to the pneumatic air supply line 50. In operation of the pallet board remover 10, the pivot action of the L shaped bars 26 is achieved through the use of the 3-way normally open sensor valve 64 which is piloted from the pneumatic air supply line 50 attached to the rod end 60 of the plurality of cylinders 56. The activation switch 24 actuates the large flow air piloted 4-way air valve 53, which extends the cylinder or plurality of cylinders 56 and actuates the 3-way normally open sensor valve 64. The cylinder or plurality of cylinders 56 engage the four driving pistons 34, which move the four L shaped bars 26 to the up position. The 3-way normally open sensor valve 64 actuates the double air piloted 4-way air valve 54, which actuates the small cylinder 55 that drives the rotating gear or plurality of rotating gears 58, which are connected to the at least one removal bar assembly 22. The four L shaped bars 26 are now perpendicular to the orientation of the boards and parallel to the stringers. The four L shaped bars 26 extend over the damaged board that is desired to be removed which resides over the operation gap 14.

The four L shaped bars 26 are arranged in the pallet board remover 10 such that once the L shaped bars 26 are rotated perpendicular to the boards, the four L shaped bars 26 are approximate and adjacent to the stringers. The location of the L shaped bars 26 is important because a successful operation of the pallet board remover 10 is dependent on the L shaped bars 26 being close to the joints of a board and the stringers to effectively pull the nailed board off. Once the operator recognizes that the at least one removal bar assembly 22 is rotated and in the proper position, the operator then engages the activation switch 24 a second time. Depending on the type of activation switch employed, the engagement may vary. The detented foot pedal actuator needs to move in a second direction, while the push button actuator or pair of push button actuators must be depressed a second time. This actuates a removal cycle in which the four driving pistons 34 rapidly drive down the L shaped bars 26 to the down position such that the L shaped bars 26 catch and remove the board from the pallet. More specifically, the activation switch 24 actuates the large flow air piloted 4-way air valve 53, which retracts the cylinder or plurality of cylinders 56 and actuates the sensor valve 52. The cylinder or plurality of cylinders 56 engage the four driving pistons 34, which move the four L shaped bars 26 to the down position. After the L shaped bars 26 reach the down position, the sensor valve 52 which is piloted from the pneumatic air supply line 50 attached to the cap end 62 of each cylinder 56 signals the double air piloted 4-way air valve 54. The double air piloted 4-way air valve 54 retracts the small cylinder 55 such that the L shaped bars 26 are rotated 90 degrees back to the parallel orientation in which the driving pistons 34 and the L shaped bars 26 began. In this position, the L shaped bars 26 are in the down position and the pallet board remover 10 is ready for operation again.

If the securement bar 16 has been utilized, the securement bar 16 may be released after the operation of the at least one removal bar assembly 22 has completed. In the preferred embodiment, the detented rotary securement valve 20 can be actuated again to retract the securement cylinder 18 thereby releasing the securement bar 16. The securement bar 16 can then be moved away from the pallet such that the pallet may be removed or flipped. It is at this point in the operation that the pallet board remover 10 is ready for operation again.

While the above description represents a preferred embodiment of the pallet board remover 10, it is understood that additional sensors, valves, and other standard pneumatic operational components may be added or taken away from the pneumatic control system 50 to enable additional features of the pallet board remover 10. For example, the pneumatic control system 50 as shown in FIG. 6 enables an activation switch 24 as embodied by a detented foot pedal actuator of a 3-way forward valve. Additional valves and actuators must be added to the pneumatic control system 50 to enable the safer embodiment wherein the activation switch 24 comprises a pair of push button actuators that must be simultaneously depressed to operate the pallet board remover 10.

Figure 7:
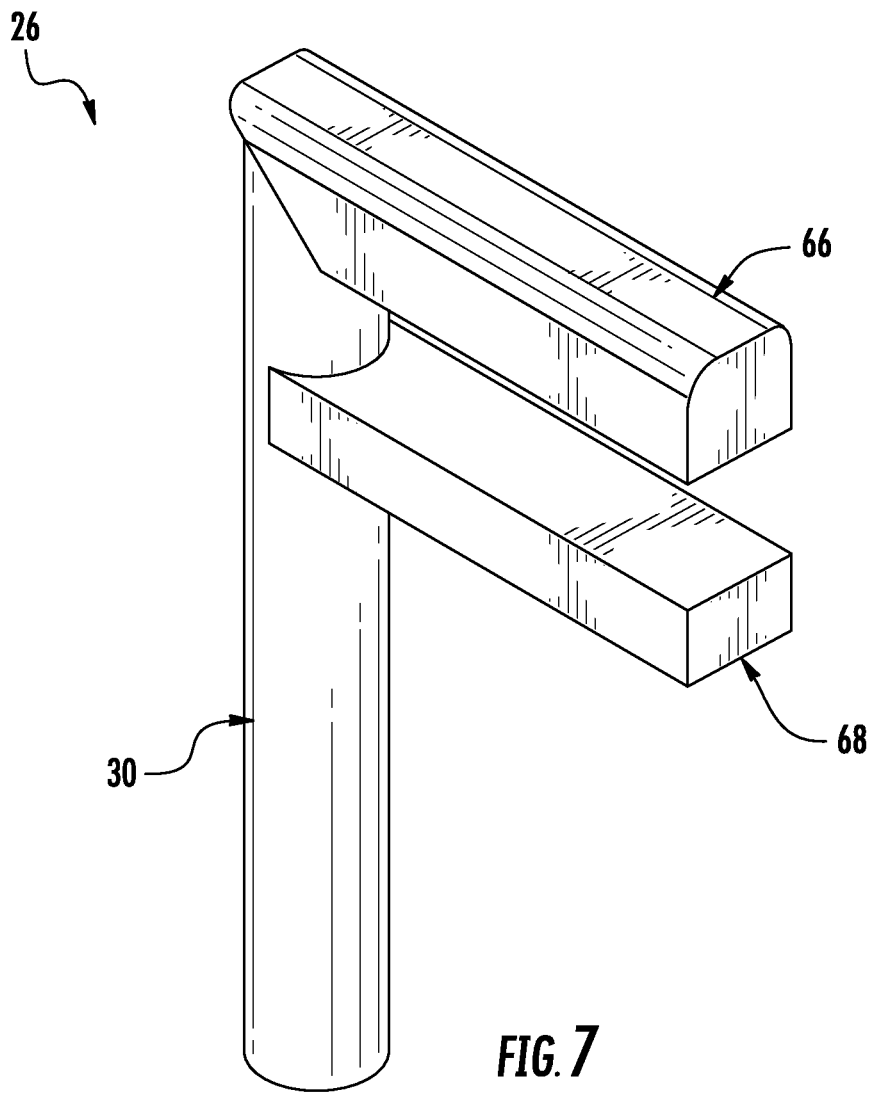
FIG. 7 is a front perspective view of an alternate embodiment of the L shaped bar.

In an alternative embodiment, the L shaped bar 26 comprises a first protruding portion 66 and a second protruding portion 68 instead of the protruding portion 28 as described above. This embodiment is shown in FIG. 7. In this embodiment, the L shaped bar 26 resembles an F shape.

In another embodiment, the present invention is a method for removing a board from a pallet comprising the steps of loading the pallet onto the top surface 12 of the pallet board remover 10 as described above, positioning the board over the operation gap 14 of the top surface 12, and engaging the activation switch 24 that actuates the driving action of the at least one removal bar assembly 22. The method further comprises the step of engaging the activation switch 24 a second time to actuate the removal cycle after the driving action is completed. The driving action of the at least one removal bar assembly 22 is controlled by the pneumatic control system 50. Preferably, the method further comprises the step of positioning the securement bar 16 over the pallet after the board is positioned over the operation gap 14 of the top surface 12. In a preferred safer embodiment, the activation switch 24 is a pair of push button actuators.

While several particular embodiments of the present pallet board remover have been described herein, it will be appreciated by those skilled in the art that changes and modifications may be made thereto without departing from the invention in its broader aspects and as set forth in the following claims.

What is claimed is:

1. A pallet board remover for removing a board from a pallet, comprising:
    a top surface for receiving the pallet;
    an operation gap provided on said top surface; and
    an at least one removal bar assembly operationally located near said operation gap wherein said at least removable bar assembly having a pivotal member extendible and retractable above and below said top surface.

2. The pallet board remover of claim 1, wherein said at least one removal bar assembly
    comprises an L shaped bar that resides in an upside down manner.

3. The pallet board remover of claim 2, wherein said at least one removal bar assembly
    further comprises a driving piston, wherein said L shaped bar is moveable between a down position and an up position by said driving piston.

4. The pallet board remover of claim 2, wherein said L shaped bar comprises a protruding portion and an elongated portion.

5. The pallet board remover of claim 2, wherein said L shaped bar comprises a first
    protruding portion, a second protruding portion, and an elongated portion.

6. The pallet board remover of claim 1, wherein said at least one removal bar assembly
    comprises four removal bar assemblies.

7. The pallet board remover of claim 1 further comprising an activation switch for engaging
    said at least one removal bar assembly.

8. The pallet board remover of claim 7, wherein said activation switch is a detented foot
    pedal actuator of a 3-way forward valve.

9. The pallet board remover of claim 7, wherein said activation switch is a push button
    actuator.

10. The pallet board remover of claim 7, wherein said activation switch is a pair of push
    button actuators.

11. The pallet board remover of claim 7 further comprising a pneumatic control system that propels a driving action when said activation switch is engaged.

12. The pallet board remover of claim 1 further comprising a securement bar mounted near said top surface.

13. A pallet board remover for removing a board from a pallet, comprising:
    a top surface for receiving the pallet;
    an operation gap provided on said top surface;
    an at least one removal bar assembly operationally located near said operation gap;
    and an activation switch for engaging said at least one removal bar assembly through a pneumatic control system;
    wherein said at least one removal bar assembly comprises a driving piston and a pivotal L shaped bar residing in an upside down manner; and
    wherein said pivotal L shaped bar is moveable between a down position and an up position by
    said driving piston.

14. The pallet board remover of claim 13, wherein said pivotal L shaped bar comprises a first protruding portion, a second protruding portion, and an elongated portion.

15. The pallet board remover of claim 13, wherein said activation switch is a pair of push button actuators.

* * * * *